United States Patent
Shiga et al.

(12) 
(10) Patent No.: US 6,370,761 B2
(45) Date of Patent: Apr. 16, 2002

(54) METHOD OF MAKING A ROTOR FOR AN ELECTRIC MOTOR

(75) Inventors: Tsuyoshi Shiga; Takeshi Yamada, both of Nagoya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/283,163

(22) Filed: Apr. 1, 1999

Related U.S. Application Data

(62) Division of application No. 08/899,145, filed on Jul. 23, 1997, now Pat. No. 5,907,206.

(30) Foreign Application Priority Data

Jul. 24, 1996 (JP) .............................. 8-194560
Jan. 31, 1997 (JP) .............................. 9-19057

(51) Int. Cl.⁷ ...................... H02K 15/03; B29B 11/06
(52) U.S. Cl. ...................... 29/598; 29/596; 29/527.1; 264/272.19; 264/272.2
(58) Field of Search .................. 29/598, 596, 607, 29/527.1, 33 L; 264/272.2, 272.19, 261, 272.11; 310/156, 89

(56) References Cited

U.S. PATENT DOCUMENTS

| | | | |
|---|---|---|---|
| 3,821,570 A | | 6/1974 | Burson ..................... 310/70 A |
| 4,403,402 A | * | 9/1983 | Tomite et al. ................. 29/598 |
| 4,640,808 A | * | 2/1987 | Okumura et al. ............ 264/261 |
| 4,710,659 A | | 12/1987 | Takano et al. ............... 310/153 |
| 4,847,528 A | * | 7/1989 | Eguchi et al. ............ 264/272.2 |
| 5,004,577 A | * | 4/1991 | Ward ..................... 264/272.19 |
| 5,038,460 A | * | 8/1991 | Ide et al. ....................... 29/596 |
| 5,118,978 A | | 6/1992 | Matsumoto et al. ......... 310/153 |
| 5,223,759 A | * | 6/1993 | Shimoda et al. .............. 29/598 |
| 5,232,652 A | * | 8/1993 | Bianco ..................... 264/272.2 |

FOREIGN PATENT DOCUMENTS

| | | | | |
|---|---|---|---|---|
| JP | 55-51518 | * | 4/1980 | ............. 264/272.19 |
| JP | 62-30305 | * | 2/1987 | ............... 264/272.2 |

* cited by examiner

Primary Examiner—Peter Vo
Assistant Examiner—A. Dexter Tugbang
(74) Attorney, Agent, or Firm—Pillsbury Winthrop LLP

(57) ABSTRACT

A method of making a rotor for an electric motor includes accommodating, in a forming mold, a plurality of annularly disposed rotor magnets, a frame made of steel plate and formed generally into a shape of a cup, the frame having an annular wall disposed outside the annularly disposed rotor magnets so as to be located at a side opposed to a stator with respect to the rotor magnets, the annular wall having a open end, and a ring member made of a magnet material and disposed along the annular wall of the frame at an inner or outer circumferential side of the annular wall, the rotor magnets being held by magnet holding means provided in the forming mold in execution of the accommodating step, and pouring a molten resin into the forming mold accommodating the rotor magnets, the frame and the ring member and hardening the resin.

11 Claims, 17 Drawing Sheets

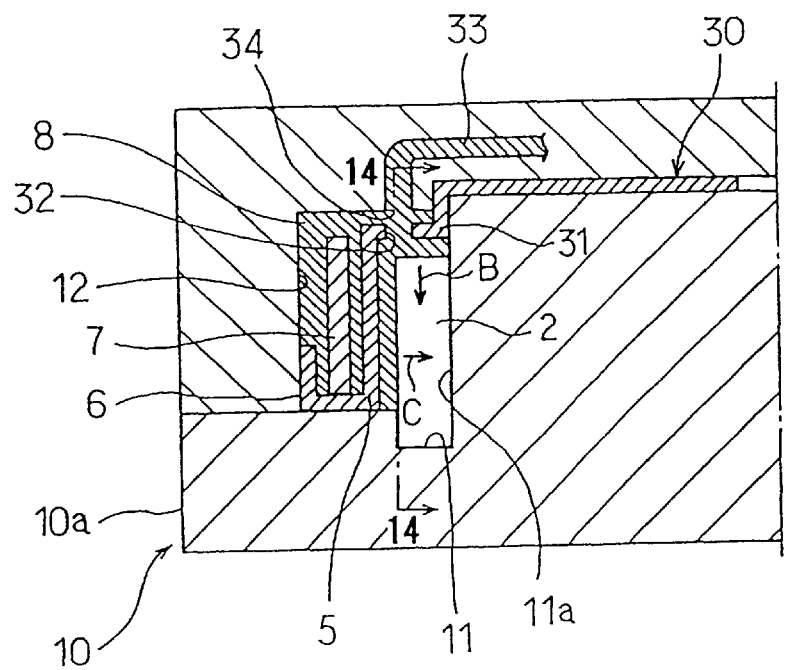
F I G. 1 3
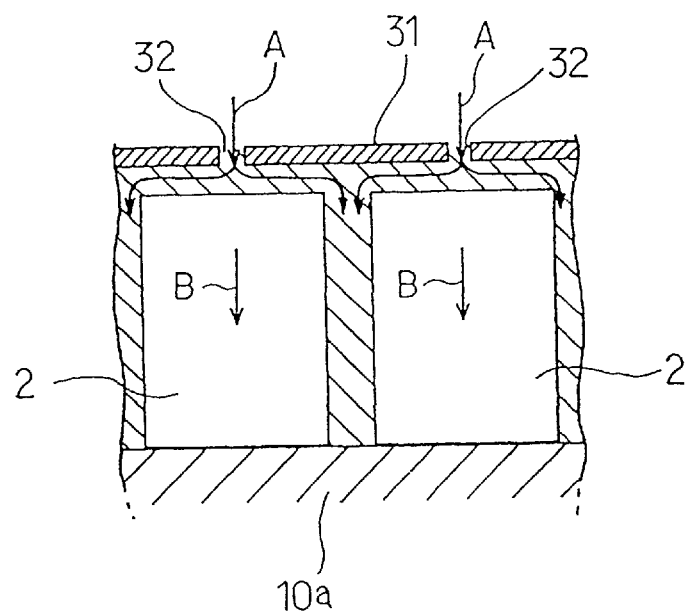
F I G. 1 4

METHOD OF MAKING A ROTOR FOR AN ELECTRIC MOTOR

This is a Divisional of application Ser. No. 08/899,145, filed Jul. 23, 1997, and now U.S. Pat. No. 5,907,206.

BACKGROUND OF THE INVENTION

1. Field of the Invention

This invention relates generally to electric motors, and more particularly to a method of making a rotor for electric motors in which rotor magnets and a rotor frame are integrated by a resin.

2. Description of the Prior Art

The prior art has provided outer rotor type electric motors in which a bottomed short cylindrical rotor having a relatively large diameter is used. The rotor comprises a bottomed short cylindrical frame having a large diameter and made of a steel plate and a number of rotor magnets mounted on an inner circumferential surface of an annular wall of the frame. With regard to mounting the rotor magnets on the inner circumferential surface of the frame wall, the prior art has proposed a method of integrating the rotor magnets and frame by means of a resin. More specifically, the rotor magnets and frame are accommodated in a cavity of a forming mold. Subsequently, a molten resin is poured into the cavity to be hardened so that the rotor magnets and frame are enclosed in the hardened resin to be integrated together.

The thickness of the annular wall of the frame needs to be increased in the above-described rotor so that magnetic paths are sufficiently secured for the rotor magnets. However, the increase in the thickness of the annular wall results in an increase in the thickness of a bottom wall of the frame. That is, the bottomed short cylindrical frame is formed by pressing a steel plate and accordingly, the thickness of the steel plate needs to be increased so that the thickness of the annular wall of the frame is increased. This also increases the thickness of the bottom wall of the frame. Thus, the entire thickness of the frame is increased. This disadvantageously increases the entire weight of the rotor.

SUMMARY OF THE INVENTION

Therefore, an object of the present invention is to provide a method of making a rotor for the electric motor wherein the magnetic paths can sufficiently be secured for the rotor magnets without an increase in the entire thickness of the frame and with an increase in the weight of the rotor being restrained, the method having a high working efficiency.

The invention provides a method of making a rotor for an electric motor including a stator, the method comprising steps of accommodating, in a forming mold, a plurality of annularly disposed rotor magnets, a frame made of steel plate and formed generally into a shape of a bottomed short cylinder, the frame having an annular wall disposed outside the annularly disposed rotor magnets so as to be located at a side opposed to the stator with respect to the rotor magnets, the annular wall having an open end, and a ring member made of a magnetic material and disposed along the annular wall of the frame at an inner or outer circumferential side of the annular wall, the rotor magnets being held by magnet holding means provided in the forming mold in execution of the accommodating step, and pouring a molten resin into the forming mold accommodating the rotor magnets, the frame and the ring member and hardening the resin.

According to the above-described method, the work for accommodating the rotor magnets, the frame and ring member into the forming mold can be readily performed.

In the above-described method, the axial ends of the rotor magnets projecting outward from the open end of the annular wall of the frame are fitted into concave portions formed in the forming mold so that the rotor magnets are positioned. Consequently, the rotor magnets can readily and accurately be positioned relative o the forming mold.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 13 is a partial longitudinal section of the rotor of a fifth embodiment in accordance with the present invention, showing the state during the forming step;

FIG. 14 is a partial longitudinal section taken along line 14—14 in FIG. 13;

DETAILED DESCRIPTION OF THE PREFERRED EMBODIMENTS

Figure 1:
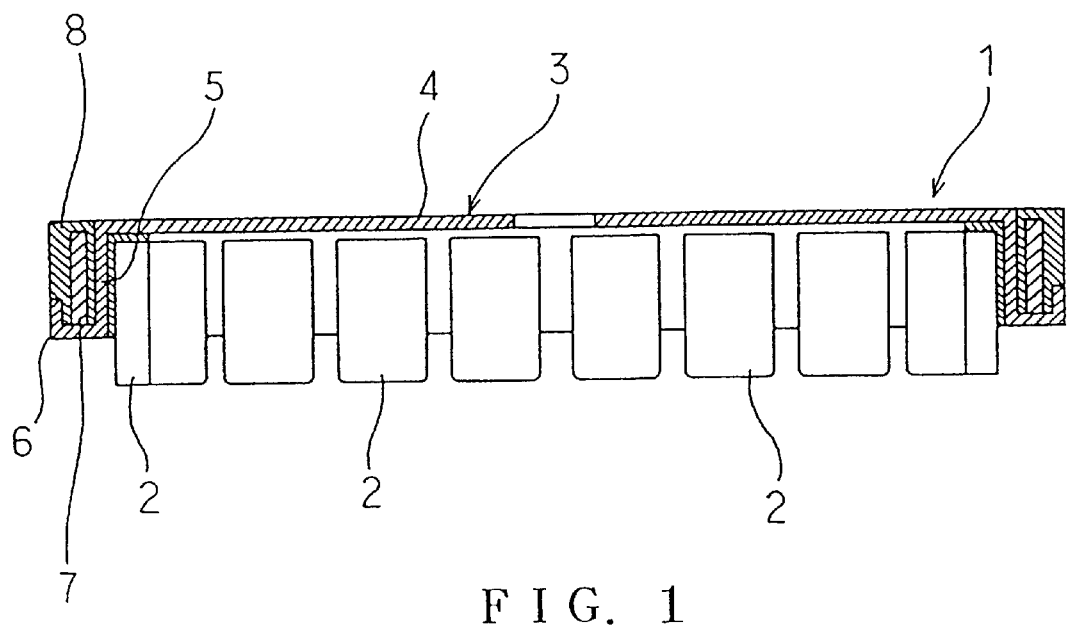
FIG. 1 is a longitudinal section of a rotor of a first embodiment in accordance with the present invention.
Figure 2:
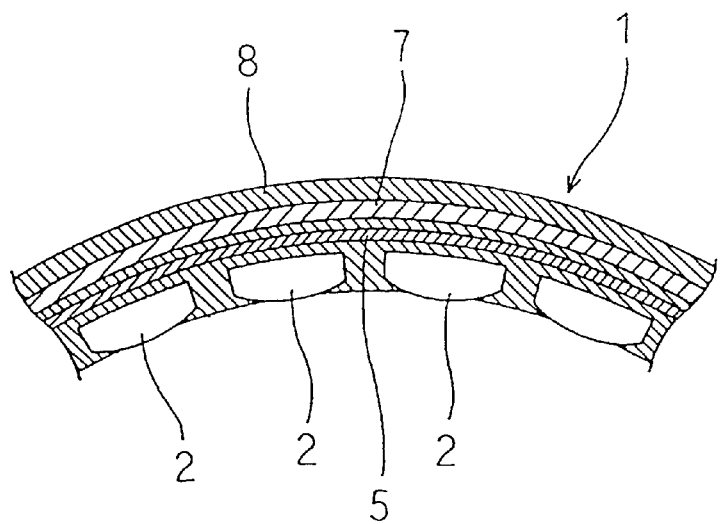
FIG. 2 is a partial transverse section of the rotor.
Figure 3:
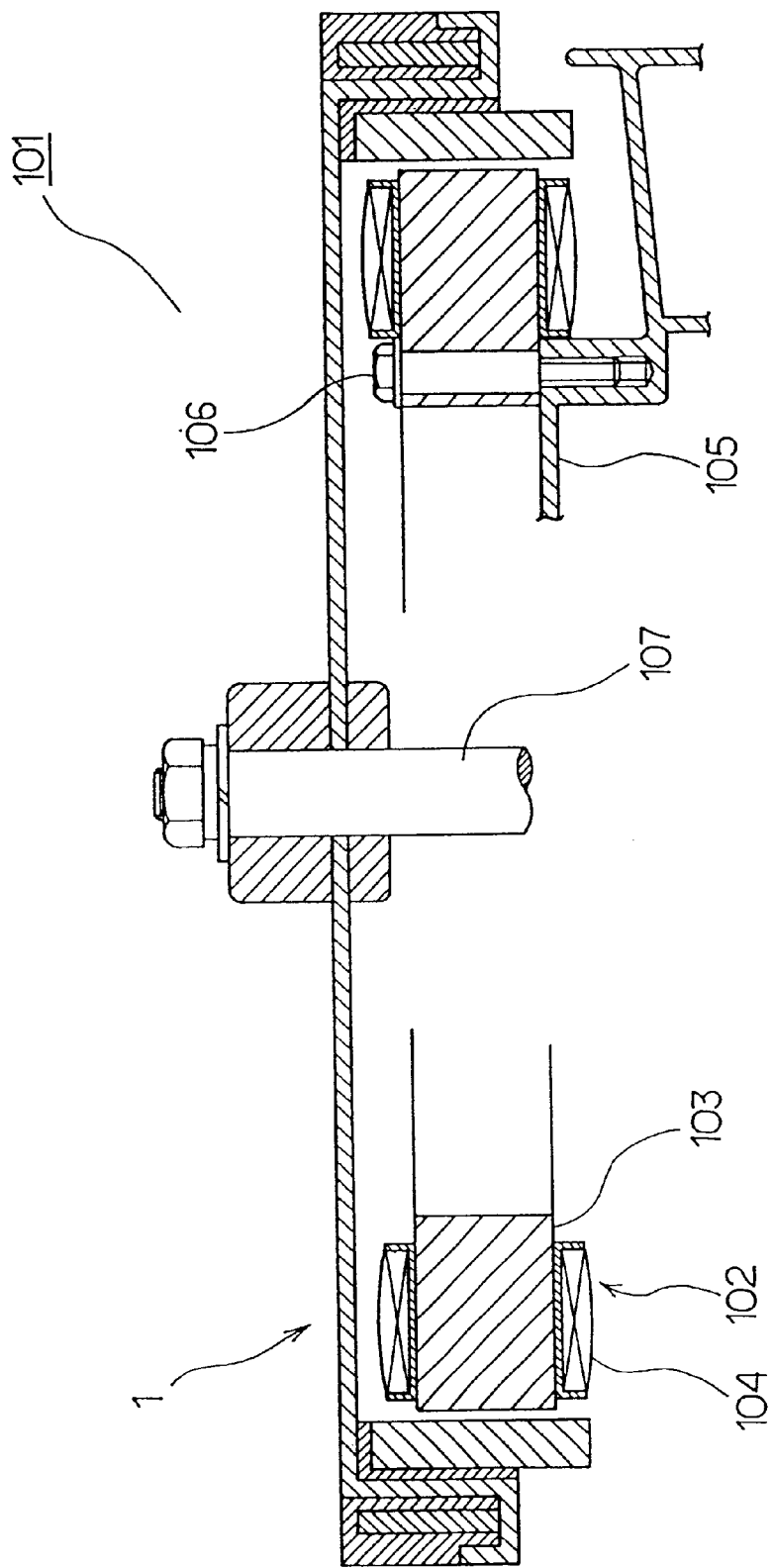
FIG. 3 is a longitudinal section of the motor to which the rotor of the invention is applied.
Figure 4A:
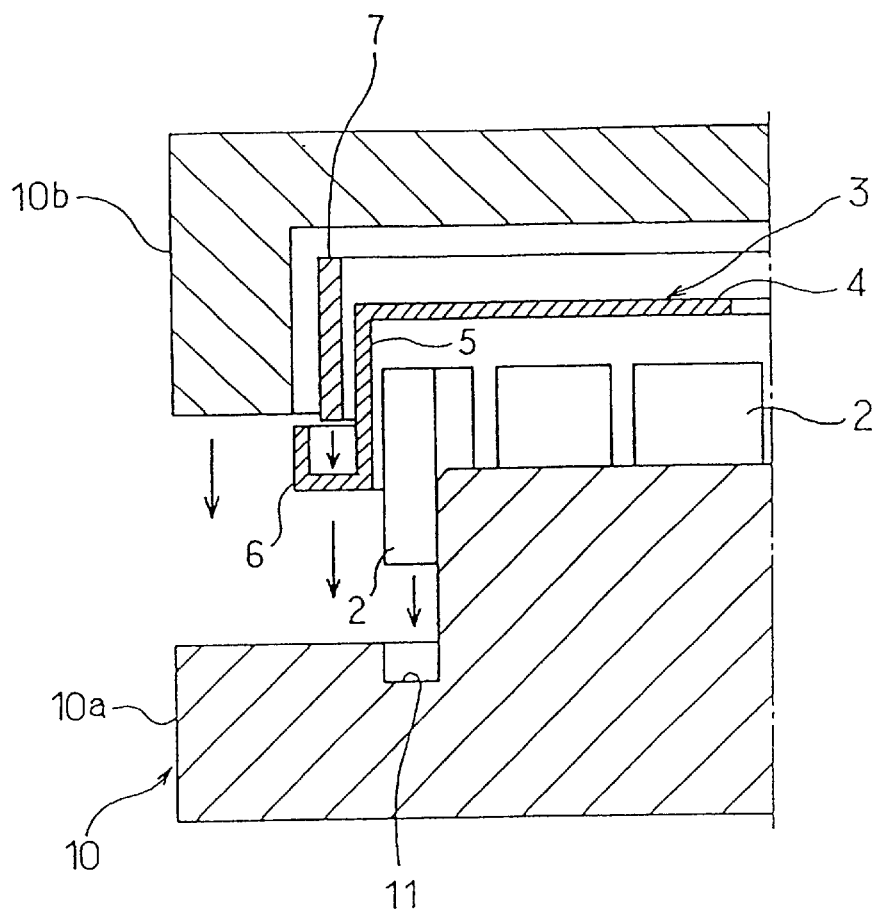
FIGS. 4A and 4B are partial longitudinal sections of the forming mold and the rotor, showing manufacturing steps.
Figure 4B:
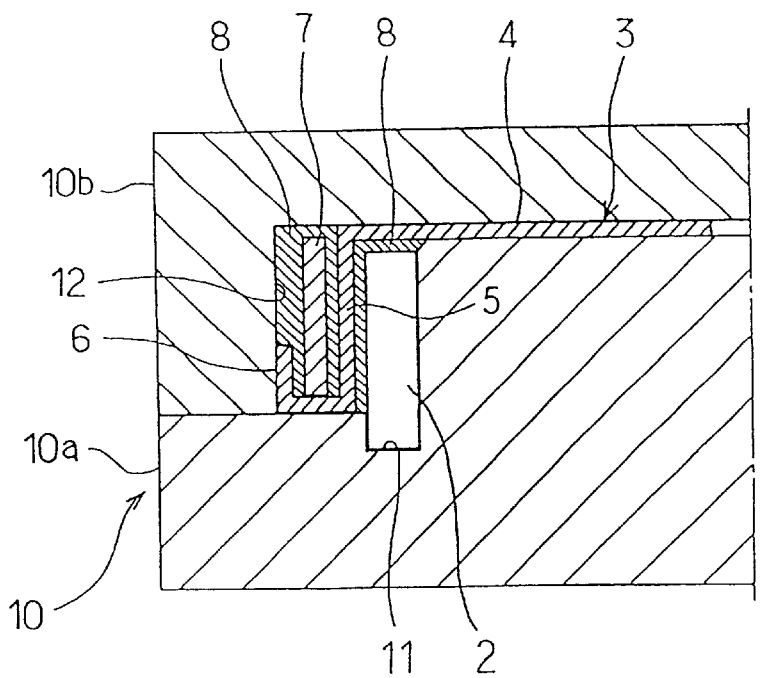

A first embodiment of the present invention will be described with reference to FIGS. 1 to 4B. The invention is applied to the rotor for an outer rotor type electric motor. FIGS. 1 and 2 each illustrate the construction of a rotor 1 manufactured in accordance with the invention. FIG. 3 illustrates the construction of the motor incorporating the rotor 1 shown in FIGS. 1 and 2. FIGS. 4A and 4B illustrate manufacturing steps for the rotor 1.

Referring to FIG. 3, the construction of the outer rotor type motor 101 will be described in brief. The motor 101 is a three-phase brushless dc motor, for example. The motor 101 comprises a generally annular stator 102 and the rotor 1 covering the entire stator 102 and mounted for rotation. The stator 102 comprises a generally annular stator core 103 and a winding 104 wound on the stator core 103. The stator 102 is mounted on a motor mounting plate 105 by a plurality of screws 106 one of which is shown. A shaft 107 fixed to a central portion of the rotor 1 extends through a central portion of the stator 102 and is rotatably mounted on bearing means (not shown).

The construction of the rotor 1 will now be described with reference to FIGS. 1 and 2. The rotor 1 comprises a bottomed short cylindrical frame 3 and a number of rotor magnets 2 mounted on an inner circumferential surface of an annular wall 5 of the frame 3. The rotor magnets 2 are each made of a slender plate-shaped member and disposed annularly. The frame 3 is formed by pressing a steel plate and includes a disc-like main plate 4, a short cylindrical annular wall 5 extending downward from an outer circumferential end of the main plate 4 as viewed in FIG. 1, and a holder portion 6 extending from a lower outer circumferential end of the annular wall 5 and having a generally L-shaped section, all of which are formed integrally with the frame 3. The annular wall 5 of the frame 3 is disposed outside the rotor magnets 2 so as to be located at a side opposed to the stator 102 with respect to the rotor magnets 2. The holder portion 6 has a concave portion in which a short cylindrical ring member 7 made of a magnetic material is disposed along an outer circumferential surface of the annular wall 5. The rotor magnets 2, frame 3 and ring member 7 are enclosed in a resin molded member 8 formed around the annular wall 5 so as to be integrated together as will be described later. Lower ends of the rotor magnets 2 as viewed in FIG. 1 or one of axial ends of the rotor magnets project downward from a lower end or an open end of the frame 3.

The manufacture of the above-described rotor 1 will be described with reference to FIGS. 4A and 4B. A forming mold 10 includes a lower mold 10a and an upper mold 10b to be put on the lower mold 10a. First, a number of rotor magnets 2 are accommodated in a recess 11 defined in the lower mold 10a so to be arranged annularly, as shown in FIG. 4A. The recess 11 is formed in the lower mold 10a so that the axial ends of the rotor magnets 2 projecting outward (downward as viewed in FIGS. 4A and 4B) from the lower open end of the annular wall 5 of the frame 3 are fitted into the recess 11. The frame 3 is disposed on the lower mold 10a so that the annular wall 5 thereof is positioned outside the rotor magnets 2. With this, the ring member 7 is placed in the concave portion of the holder portion 6 of the frame 3, being fitted with the outer circumference of the annular wall 5.

Subsequently, the upper mold 10b is put on the lower mold 10a from above so that the forming mold 10 is closed, as shown in FIG. 4B. A predetermined amount of molten resin is poured through gates (not shown) into a cavity 12 defined between the lower and upper molds 10a and 10b and then hardened. The amount of resin is determined so that the resin spreads over both outer and inner circumferential sides of the annular wall 5. The resin molded member 8 is formed by the resin poured into the cavity 12 and then hardened. The rotor magnets 2, frame 3 and ring member 7 are enclosed by the hardened resin molded member 8 to thereby be integrated by the resin molded member 8. Subsequently, the forming mold 10 is opened so that the rotor 1 is taken out.

According to the first embodiment, the ring member 7 made of the magnetic material is disposed along the annular wall of the frame 3 made of the steel plate. As a result, magnetic paths for the rotor magnets 2 can sufficiently be secured by the annular wall 5 and the ring member 7. Moreover, the thickness of the annular wall 5 and accordingly, the entire thickness of the frame 3 need not be increased even though the magnetic paths are secured for the rotor magnets 2. Furthermore, the entire weight of the rotor 1 is increased by the ring member 7. However, the increase in the weight of the rotor 1 can be restrained to a smaller extent as compared with the case where the entire thickness of the frame 3 is increased.

The rotor magnets 2 are placed in the recess 11 of the lower mold 10a so as to be axially positioned. Consequently, the rotor magnets 2 can readily be positioned relative to the forming mold 10 and moreover, the positioning work can accurately be performed.

Figure 5:
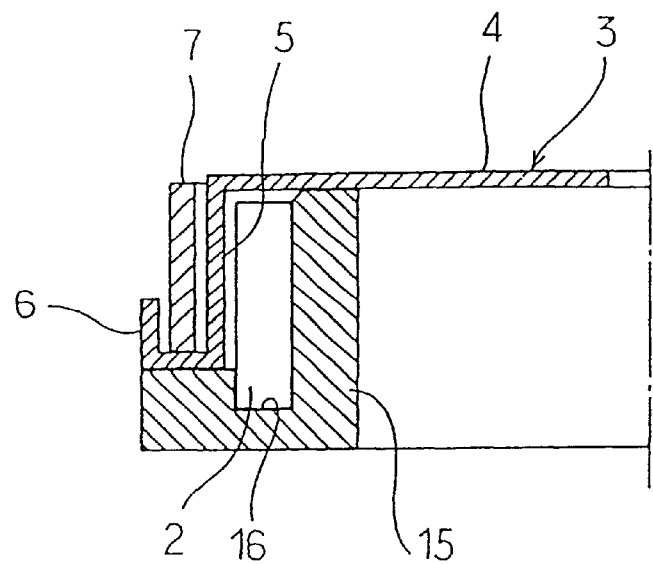
FIG. 5 is a partial longitudinal section of the rotor held by the intermediate mold, showing a second embodiment in accordance with the invention.
Figure 6:
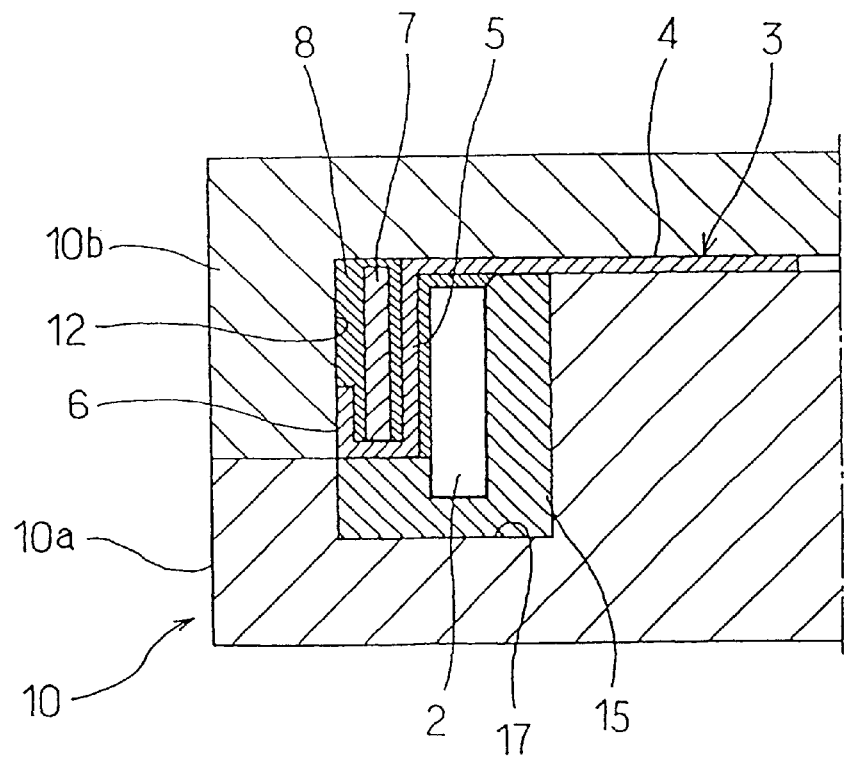
FIG. 6 is a partial longitudinal section of the rotor in the forming step.

FIGS. 5 and 6 illustrate a second embodiment of the invention. The identical parts are labeled by the same reference symbols in the second embodiment as in the first embodiment. The differences between the first and second embodiments will be described. In the second embodiment, an intermediate mold 15 is used together with the forming mold 10. The intermediate mold 15 is attached to and detached from the forming mold 10. As shown in FIG. 5, the intermediate mold 15 has a generally L-shaped section and is generally annular. The intermediate mold 15 is adapted to hold on its outer circumference the rotor magnets 2 and the frame 3 with the ring member 7 being attached thereto.

In manufacture of the rotor 1, the rotor magnets 2 are fitted into a recess 16 of the intermediate mold 15 to be held in position, as shown in FIG. 5. The recess 16 is formed in the intermediate mold 15 so that the axial ends of the rotor magnets 2 projecting outward (downward as viewed in FIG. 5) from the lower open end of the annular wall 5 of the frame 3 are fitted into the recess 16. The frame 3 is then placed on an upper surface of the intermediate mold 15 to be held thereon and the ring member 7 is placed on the holder portion 6 of the frame 3 to be held thereon. The intermediate mold 15 holding these parts is accommodated in an accommodating section 17 formed in the lower mold 10a of the forming mold 10 as shown in FIG. 6. Subsequently, the upper mold 10b is put on the lower mold 10a so that the forming mold 10 is closed. The resin is then poured into the cavity 12 to be hardened. Consequently, the same rotor 1 is formed in the second embodiment as in the first embodiment. The intermediate mold 15 is removed from the formed rotor 1.

The construction of the rotor 1 other than described above in the second embodiment is the same as that in the first embodiment. Accordingly, the same effect can be achieved in the second embodiment as in the first embodiment. In the second embodiment, particularly, the rotor magnets 2, frame 3 and ring member 7 are held by the intermediate mold 15. The intermediate mold 15 is then accommodated in the forming mold 10 so that the rotor 1 is formed. Consequently, the work for accommodating the rotor magnets 2, frame 3 and ring member 7 in the forming mold 10 can be rendered easier. Furthermore, the contact of intermediate mold 15 with the rotor magnets 2 sometimes wears the intermediate mold when the rotor magnets 2 are fitted into the intermediate mold. Since only the intermediate mold 15 among the molds is worn, it needs to be replaced by a new one. Consequently, the maintenance of molds is rendered easier and the cost for replacement of the molds is reduced. Since the rotor magnets 2 are directly attracted to the lower mold when the intermediate mold is not used, the lower mold is worn. In this case, the lower mold needs to be replaced by a new one. In the above-described embodiment, however, the replacement of the lower mold 10a is not required.

Furthermore, the rotor magnets 2 are fitted in the recess 16 of the intermediate mold 15 constituting the forming mold 10. The intermediate mold 15 is then accommodated in the accommodating section 17 of the lower mold 10a so that the rotor magnets 2 are radially positioned. Consequently, the rotor magnets 2 can readily and reliably be positioned relative to the forming mold 10.

Figure 7:
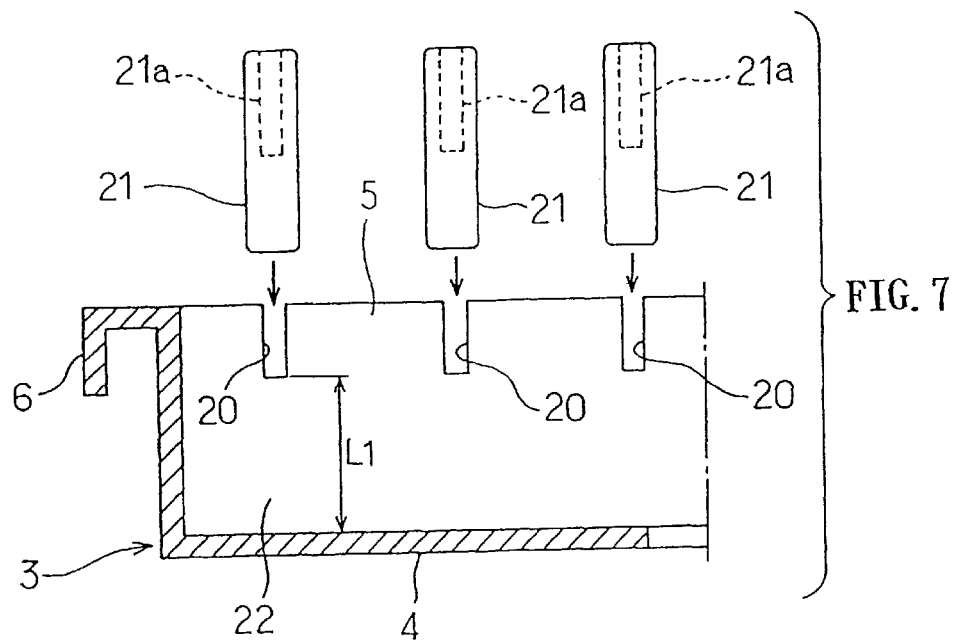
FIG. 7 is a partial longitudinal side section of the rotor of a third embodiment in accordance with the present invention, showing the positioning members to be mounted on the annular wall.
Figure 8:
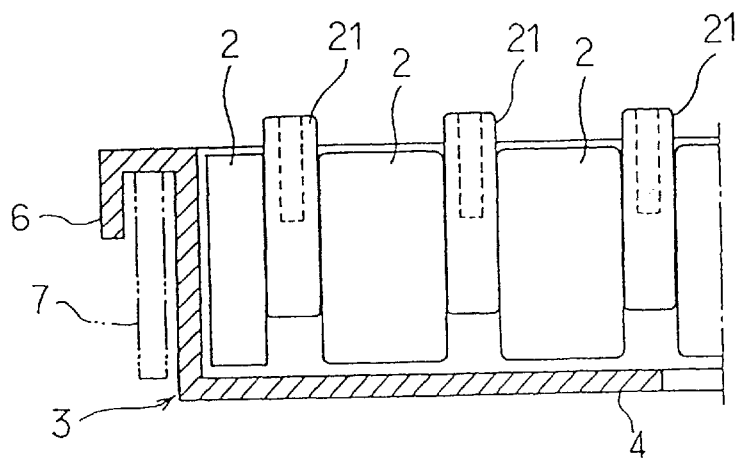
FIG. 8 is a partial longitudinal side section of the rotor, showing the rotor magnets being disposed between the positioning members.
Figure 9:
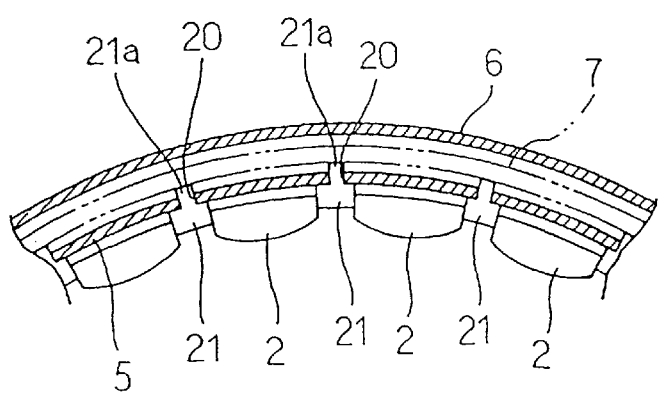
FIG. 9 is a partial transverse section of the rotor in the same state as in FIG. 8.

FIGS. 7 to 9 illustrate a third embodiment of the invention. The identical parts are labeled by the same reference symbols in the third embodiment as in the first embodiment. The annular wall 5 of the frame 3 has a number of notch-like mounting holes 20 constituting mounting sections and formed in the upper end (open end) thereof to be circumferentially disposed at regular intervals, as viewed in FIG. 7. Positioning members 21 have protrusions 21a which are inserted in the mounting holes 20 of the annular wall 5 so that the positioning members 21 are mounted on the annular wall 5, respectively. Each rotor magnet 2 is placed between the adjacent positioning members 21. An axial length L1 of a magnetic path forming section 22 between the lower end of the mounting hole 20 as viewed in FIG. 7 and the main plate 4 is set so that the magnetic path forming section 22 is not saturated with the magnetic flux due to the rotor magnets 2. The rotor magnets 2, frame 3 and ring member 7 are accommodated in the forming mold 10 and then, the resin is poured into the forming mold to be hardened in the same manner as in the first embodiment, so that the resin molded member 8 for integrating these parts is formed. The construction of the rotor 1 other than described above in the third embodiment is the same as that in the first embodiment. Accordingly, the same effect can be achieved in the third embodiment as in the first embodiment. In the third embodiment, particularly, the rotor magnets 2 can readily be positioned by the positioning members 21 mounted on the annular wall 5 of the frame 3. Furthermore, the rotor magnets 2 can be prevented from being displaced by an injection pressure of the resin during the forming.

Figure 10:
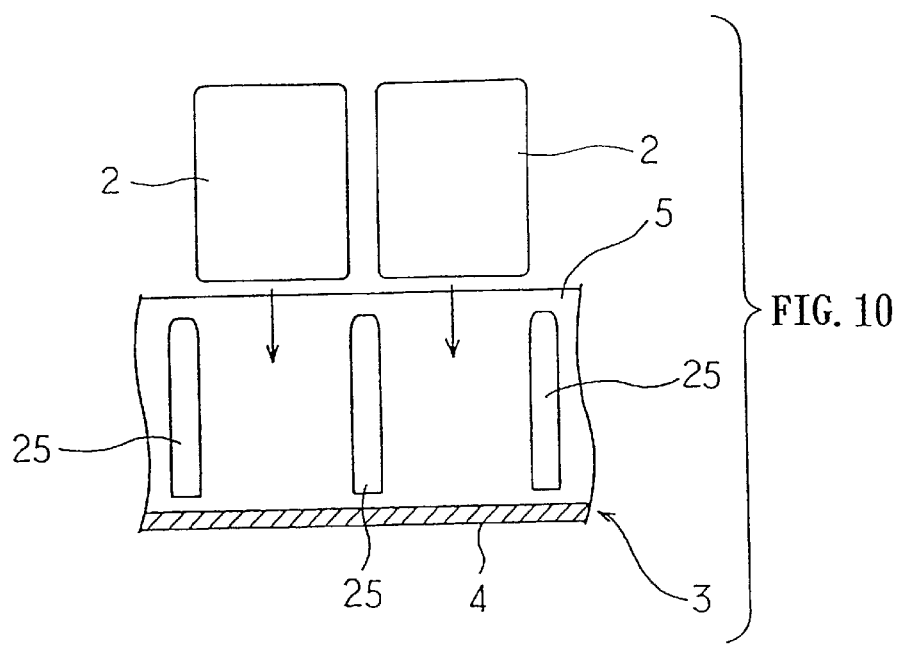
FIG. 10 is a partial longitudinal side section of the rotor of a fourth embodiment in accordance with the present invention, showing the rotor magnets to be inserted between projections of the annular wall.
Figure 11:
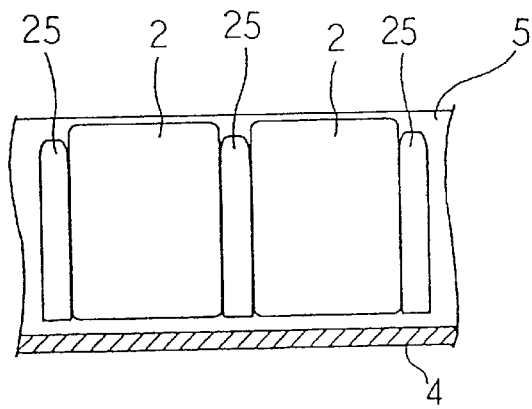
FIG. 11 is a partial longitudinal side section of the rotor, showing the rotor magnets having been inserted between the projections.
Figure 12:
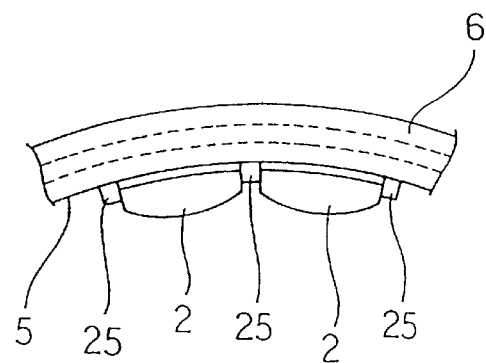
FIG. 12 is a partial plan view in the same state as in FIG. 11.

FIGS. 10 to 12 illustrate a fourth embodiment of the invention. The identical parts are labeled by the same reference symbols in the fourth embodiment as in the third embodiment. The annular wall 5 of the frame 3 has a number of protrusions 25 formed thereon to be circumferentially disposed at regular intervals and project toward the inner circumferential side. Each rotor magnet 2 is inserted into a space between the adjacent protrusions 25 so as to be mounted on the annular wall 5. The construction of the rotor 1 other than described above in the fourth embodiment is the same as that in the third embodiment. Accordingly, the same effect can be achieved in the fourth embodiment as in the third embodiment.

FIGS. 13 and 14 illustrate a fifth embodiment of the invention. The identical parts are labeled by the same reference symbols in the fifth embodiment as in the first embodiment. The main plate 31 of the frame 30 has a number of resin flow-through holes 32 formed therein to correspond to upper portions of the rotor magnets 2 respectively. After the frame 30, rotor magnets 2 and ring member 7 are accommodated in the forming mold 10, the resin is poured through runners 33 and gates 34 into the cavity 12. Flowing through the resin flow-though holes 32, the resin further flows as shown by arrows A in FIG. 14, thereby pressing the corresponding rotor magnets 2 toward the recess 11 of the lower mold 10a as shown by arrows B and toward the axial center as shown by arrow C in FIG. 13. Consequently, the rotor magnets 2 are desirably positioned and the inner side surface of each rotor magnet 2 is closely attached to the wall surface 11a of the recess 11.

Furthermore, the gates 34 and the resin flow-through holes 32 are provided in the vicinity of portions of the frame 30 spaced from the rotor magnets 2 longitudinally (vertically in FIG. 13) with respect to the rotor magnets 2 accommodated in the forming mold 10 or above the rotor magnets 2. In this disposition of the gates 34, the resin is injected through the resin flow-through holes 32 lengthwise with respect to the rotor magnets. Accordingly, since an injection pressure of the resin acts on (or toward) the portions of the rotor magnets 2 having a sufficiently high strength, the rotor magnets 2 are prevented from being split or broken.

The resin is injected from the gates perpendicularly to the surfaces of the rotor magnets if the gates are provided at the left or right hand of the rotor magnet. In this construction, the rotor magnets are sometimes broken when subjected to the injection pressure of the resin, which results in occurrence of defective. In the fifth embodiment, however, the rotor magnets 2 can reliably be prevented from being broken. The construction of the rotor 1 other than described above in the fifth embodiment is the same as that in the first embodiment. Accordingly, the same effect can be achieved in the fifth embodiment as in the first embodiment.

FIGS. 15 to 30 illustrate a sixth embodiment of the invention. Referring to FIGS. 15 to 19, a number of rotor magnets 42 constituting the rotor 41 are annularly disposed. The frame 43 is formed by pressing the steel plate as the magnetic material, for example. The frame 43 includes a disc-like main plate 44, an annular wall 45 formed along the outer circumference of the main plate 44, and a flange 46 formed along the outer circumference of the annular wall 45, all of which are formed integrally with the frame 43. The annular wall 45 is disposed outside the rotor magnets 42 so as to be located at the side opposed to the stator 47 (see FIG. 20) with respect to the rotor magnets 42. The ring member 48 made of a magnetic material is disposed along the outer circumferential surface of the annular wall 45.

Figure 19:
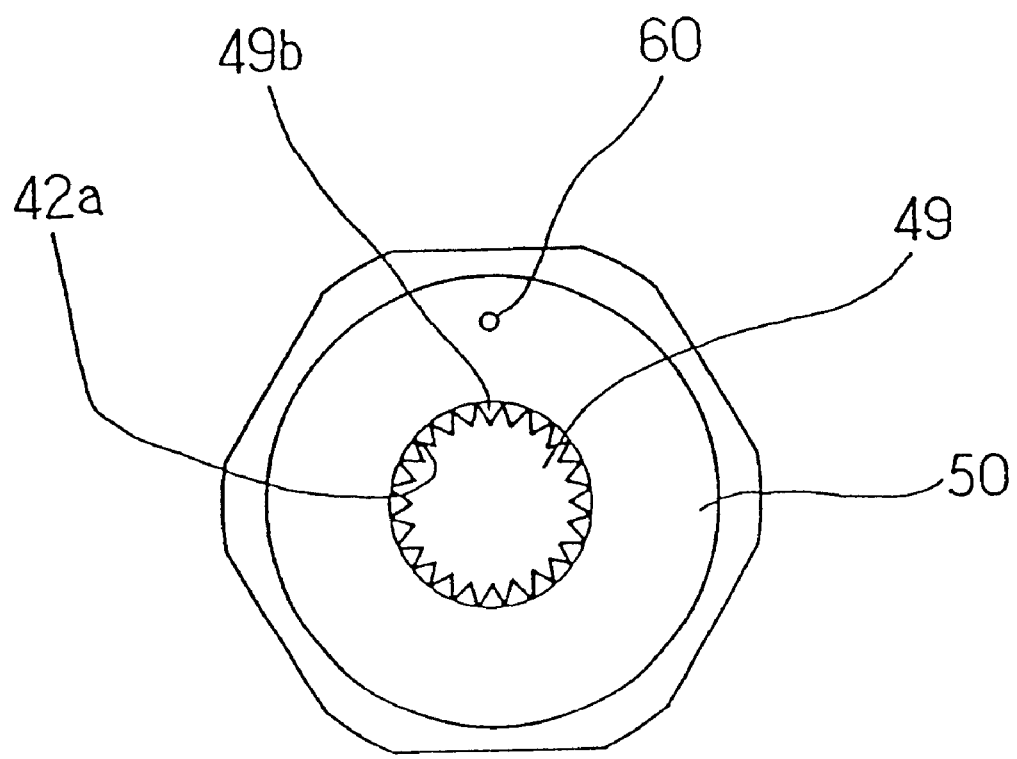
FIG. 19 is an enlarged plan view of the boss.

A boss 50 is disposed at a central portion of the main plate 44 of the frame 43. The boss 50 has an axially extending fitting hole 49. A number of axially extending grooves 49a and teeth 49b are formed on an inner circumferential surface of the fitting hole 49 of the boss 50, as shown in FIG. 19. A shaft (not shown) is fitted into the fitting hole 49 to be fixed in position. The rotor magnets 42, frame 43, ring member 48 and boss 50 are integrated by the resin molded member 51.

Figure 16:
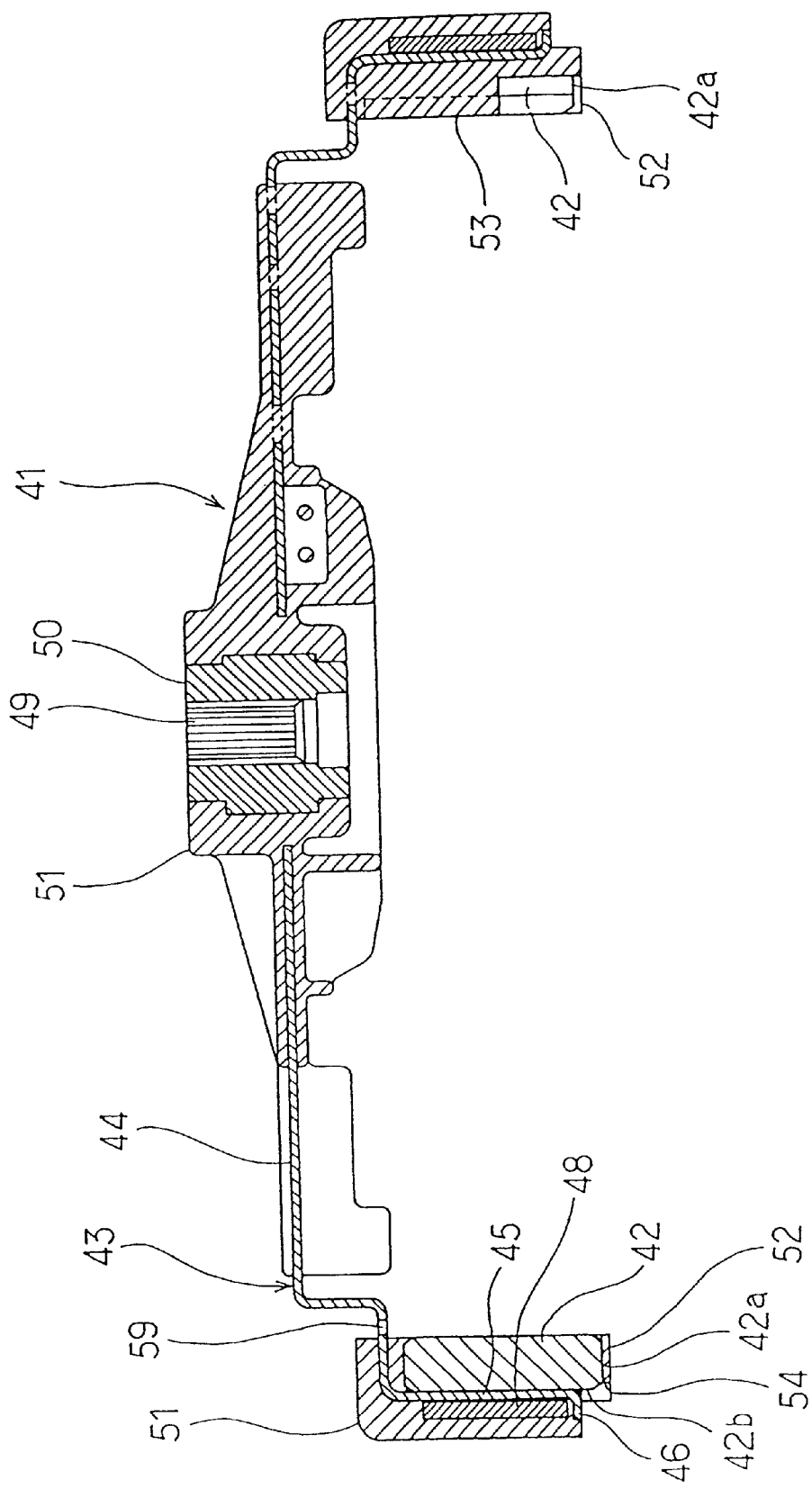
FIG. 16 is a longitudinal section of the rotor.
Figure 17:
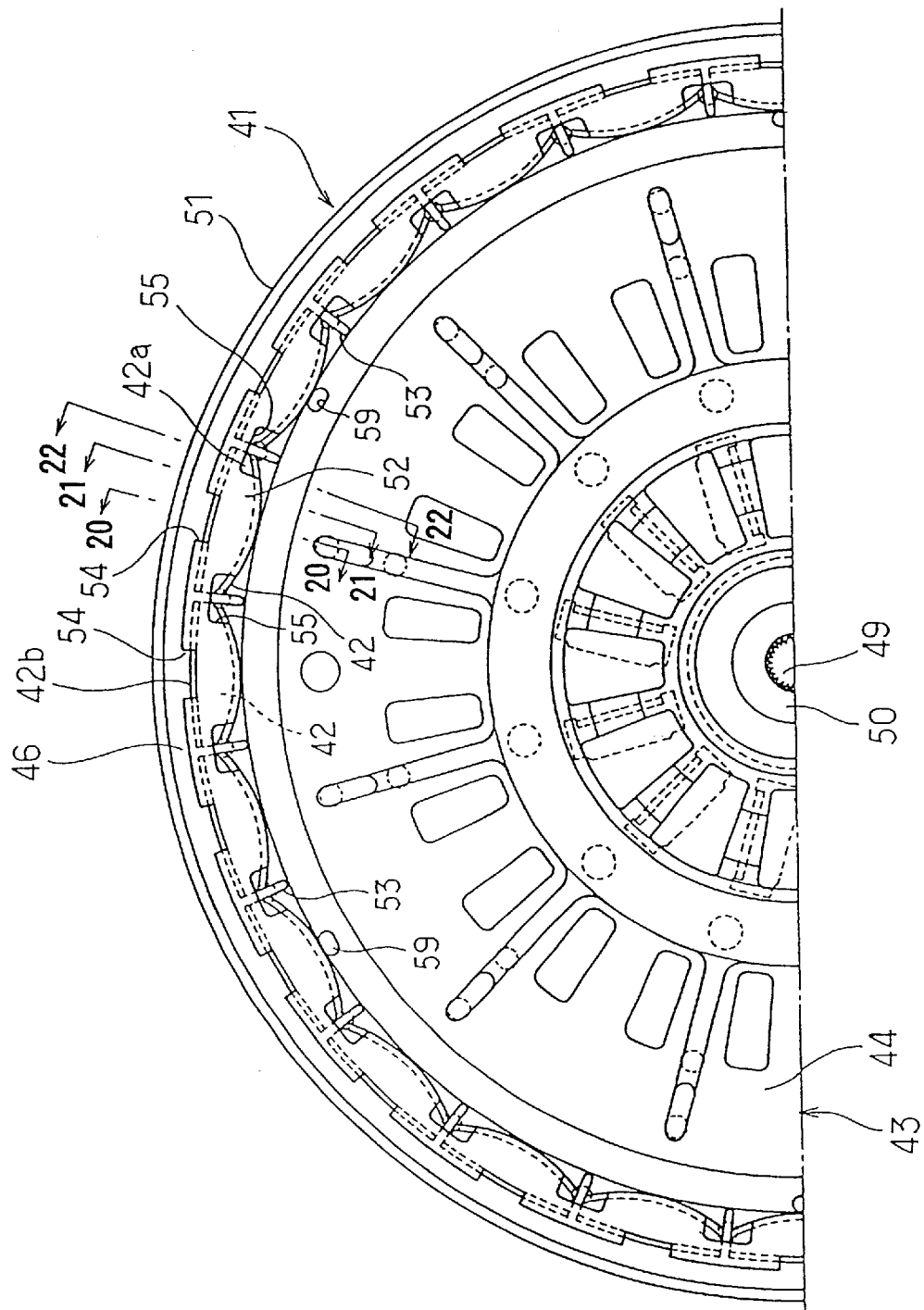
FIG. 17 is a partial plan view of the rotor as viewed from the inside thereof.

One of axial ends of each rotor magnet 42 or the lower end thereof as viewed in FIG. 16 projects downward from the open end of the annular wall 45 of the frame 43. The resin molded member 51 includes a covering portion 52 formed integrally therewith and covering the axial ends of the rotor magnets 42 projecting from the annular wall 45. More specifically, the covering portion 52 covers a part of an end face 42a of the axial end of each rotor magnet 42 and a part of an outer peripheral face 42b of the axial end of each rotor magnet 42 at the annular wall 45 side. The resin molded member 51 includes convex portions 53 formed integrally therewith. Each convex portion 53 is located between the adjacent rotor magnets 42 and has a radial distal end projecting toward the side of the stator 47 or toward the inner circumferential side. The radial distal ends of the convex portions 53 project so as to assume the same positions as the distal ends of the rotor magnets 42 projecting nearest to the stator 47 or so as to be located nearer to the stator 47 than the distal ends of the rotor magnets 42.

Figure 15:
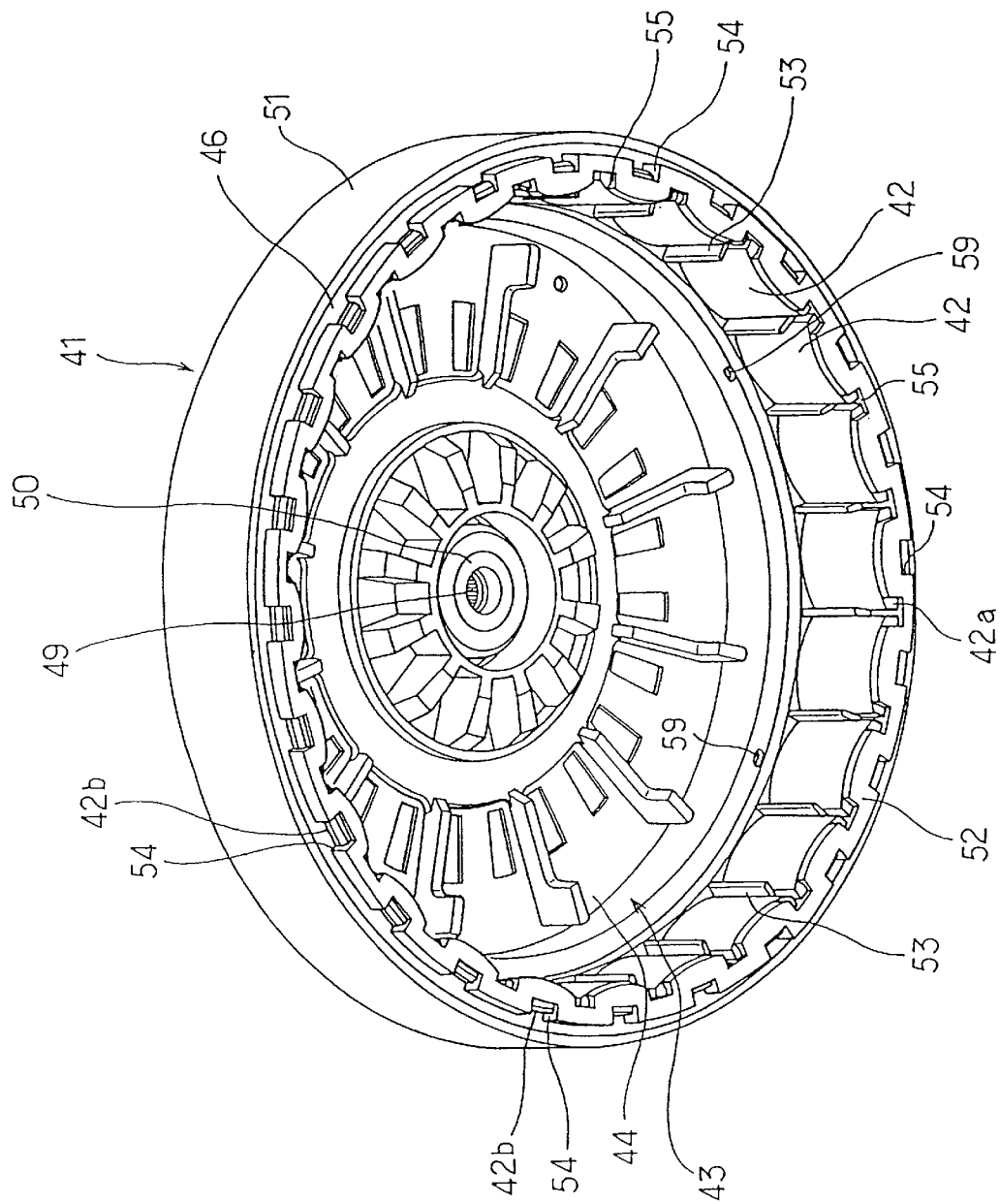
FIG. 15 is a perspective view of the rotor of a sixth embodiment in accordance with the present invention.
Figure 20:
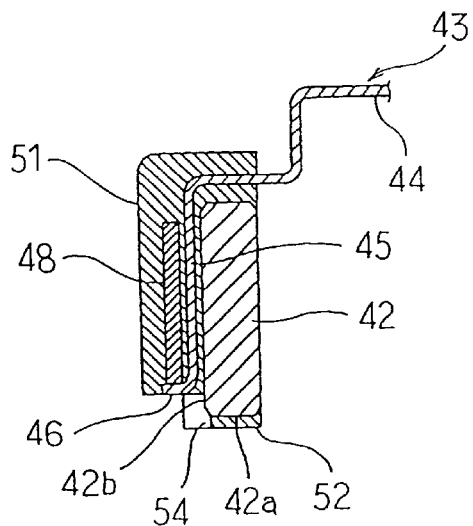
FIGS. 20, 21 and 22 are partial longitudinal sections taken along lines 20—20, 21—21 and 22—22 in FIG. 17 respectively.
Figure 21:
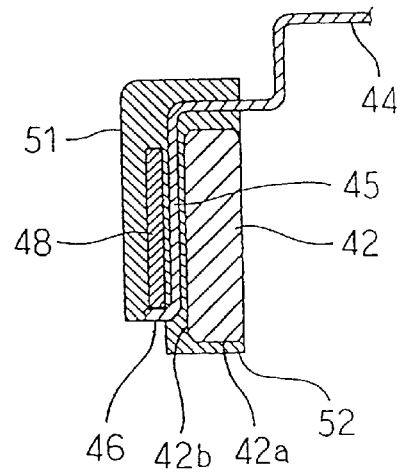
Figure 22:
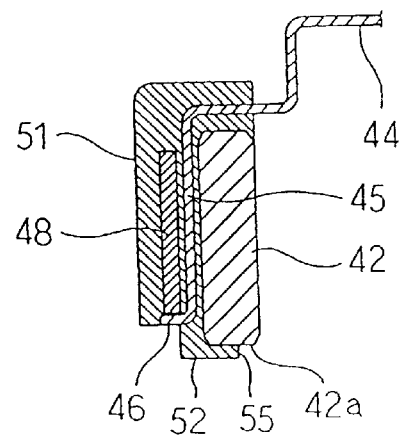

The covering portion 52 has a number of first windows 54 formed therein to correspond to outer circumferential central portions of the rotor magnets 42 respectively. The covering portion 52 further has a number of second windows 55 formed to correspond to both ends of the rotor magnets 42. Axial end faces 42a (each including an inclined face) and outer peripheral faces 42b of the rotor magnets 42 and a flange 46 or the open end of the annular wall 45 are exposed through the first windows 54, as shown in FIGS. 16 and 20. Furthermore, the axial end faces 42a of the adjacent rotor magnets 42 are exposed through the second windows 55, as shown in FIGS. 15 and 22.

Figure 23:
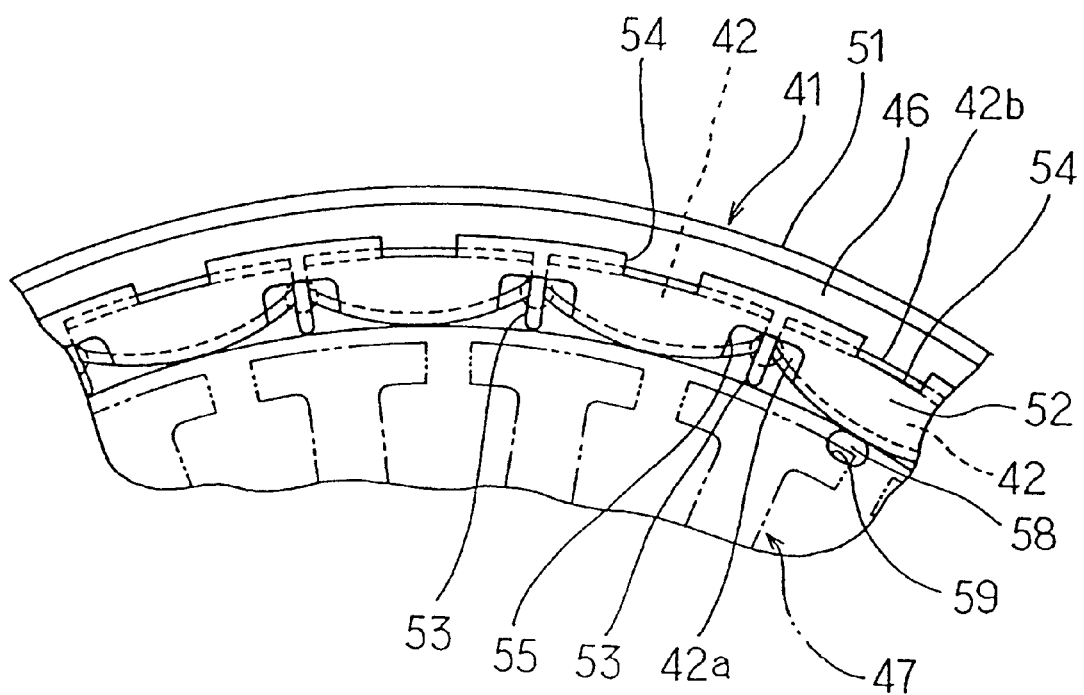
FIG. 23 is a partial plan view of the rotor, showing the positional relation with the stator.

The ring member 48 has holes 57 located between gates 56 (shown by two-dot chain line in FIG. 18) for guiding the resin into the cavity during the forming. The holes 57 constitute resin penetration sections. During the forming, the resin penetrates the holes 57 to be formed into the resin molded member 51. As shown in FIG. 23, the main plate 44 of the frame 43 has a plurality of air-gap confirming windows 59 formed therein to correspond to an air gap 58 between the rotor magnets 42 and the stator 47.

An axially outer end face of the boss 50 has a mark 60 (see FIG. 19) comprising a recess and provided to correspond to one of the teeth 49b of the fitting hole 49. Furthermore, an outer face of the main plate 44 of the frame 43 has another mark 61 (see FIG. 18) comprising a convex portion provided to correspond to the one of the teeth 49b and accordingly, to the mark 60. These marks 60 and 61 are exposed so that assembling personnel can view them.

Figure 24:
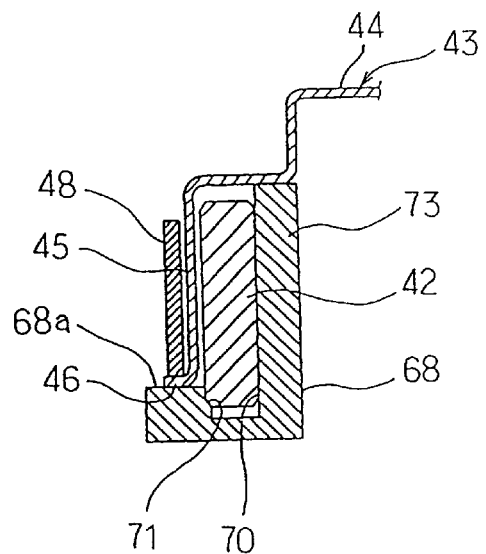
FIGS. 24, 25 and 26 are partial longitudinal sections taken along lines 20—20, 21—21 and 22—22 in FIG. 17 respectively, showing the state of the rotor magnets etc. held in the intermediate mold in a forming step.
Figure 25:
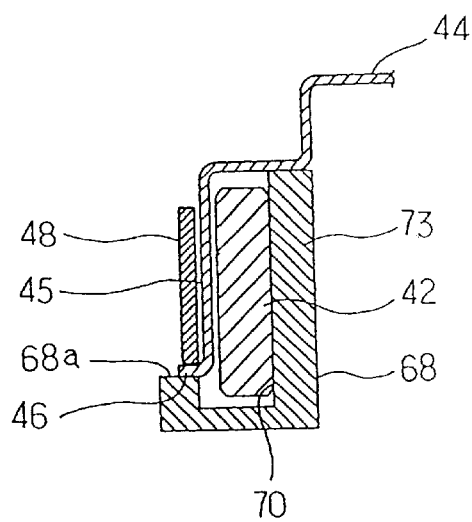
Figure 26:
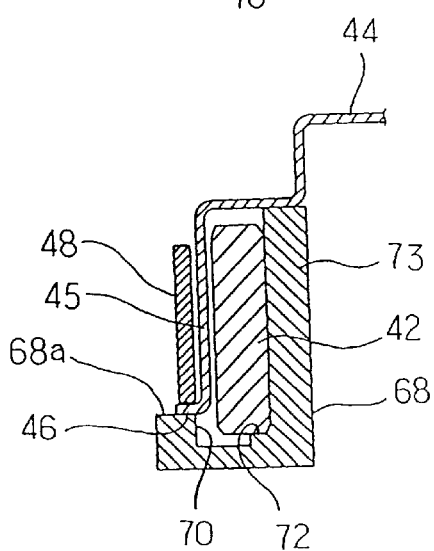

The manufacture of the rotor 41 will now be described with reference to FIGS. 24 to 30. The forming mold 65 includes a lower mold 66, intermediate mold 68 which can be attached to and detached from the accommodating section 67 of the lower mold 66, and an upper mold 69 covering the lower and intermediate molds 66 and 68. As shown in FIGS. 24 to 26, one ends of the rotor magnets 42 are inserted into the positioning recess 70 formed in the intermediate mold 68. Each rotor magnet 42 is radially positioned by a stepped portion 71 (see FIG. 24) for forming the first windows 54, a stepped portion 72 (see FIG. 26) for forming the second windows 55, and an outer circumferential surface of a cylindrical portion 73.

The frame 43 is then disposed on the intermediate mold 68 so that the annular wall 45 thereof is located outside the rotor magnets 42. Fitted with the outer circumference of the annular wall 45, the ring member 48 is placed on the flange 46 of the frame 43 to be held in position. The underside of the flange 46 of the frame 43 is abutted against the upper face of a support 68a of the intermediate mold 68.

Alternatively, the frame 43 may be disposed on the intermediate mold 68 after the ring member 48 is previously held on the frame 43.

Figure 27:
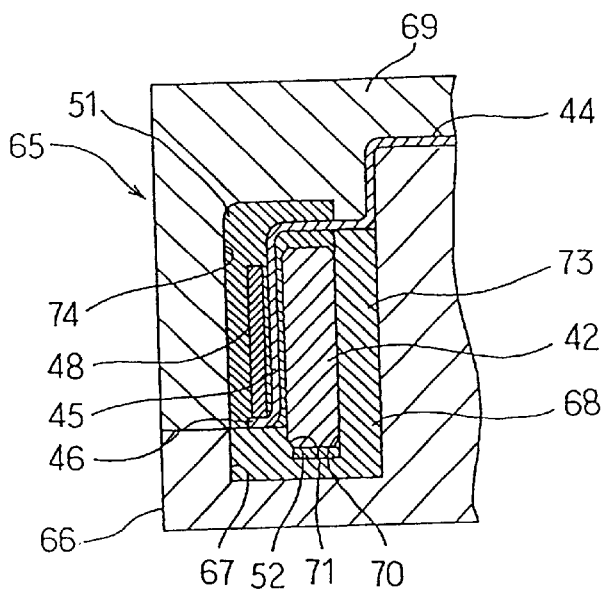
FIGS. 27, 28 and 29 are partial longitudinal sections taken along lines 20—20, 21—21 and 22—22 in FIG. 17 respectively, showing the state of the rotor portions in the forming step.
Figure 28:
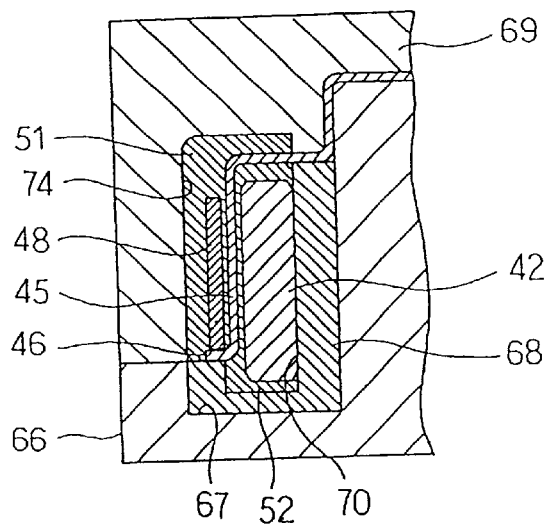
Figure 29:
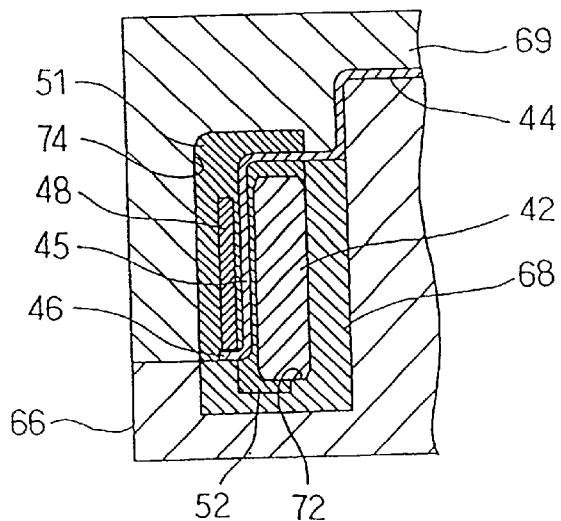

The intermediate mold 68 on which the frame 43 and the ring member 48 are mounted as described above is accommodated in the accommodating section 67 of the lower mold 66, as shown in FIGS. 27 to 29. The upper mold 69 is then placed on the lower and intermediate molds 66 and 68 so that the forming mold 65 is closed. The resin is poured through the gates 66 into the cavity 74 defined by the upper, lower and intermediate molds 69, 66 and 68 to be hardened. The resin is formed into the resin molded member 51 for integrating the rotor magnets 42, frame 43, ring member 48 and boss 50. Thereafter, the forming mold 65 is opened so that the rotor 41 is taken out of the mold. The rotor magnets 42 of the rotor 41 are magnetized by a suitable magnetizer (not shown). Furthermore, the shaft (not shown) is fitted into the fitting hole 49 of the boss 50 to be fixed in position. The rotor 41 manufactured as described above is assembled into an electric motor with the rotor magnets 42 being disposed outside the stator 47.

According to the sixth embodiment, the ring member 48 made of the magnetic material is disposed along the annular wall 45 of the steel plate frame 43 as in the first embodiment. As a result, the magnetic paths can sufficiently be secured for the rotor magnets 42 without an increase in the entire thickness of the frame 43 and with the entire weight of the rotor being rendered as small as possible. Furthermore, the rotor magnets 42 are inserted in the recess 70 of the intermediate mold 68 so as to be radially positioned. Thus, the rotor magnets 42 can readily and reliably be positioned relative to the forming mold 65. Consequently, the rotor 41 of high performance can be manufactured.

The rotor magnets 42, frame 43 and ring member 48 are held on the intermediate mold 68. The intermediate mold 68 holding these parts is accommodated in the forming mold 65. Accordingly, the rotor magnets 42 etc. can readily be accommodated in the forming mold 65. The resin molded member 51 for integrating the rotor magnets 42 etc. includes the integrally formed covering portion 52 for covering the axial end faces of the rotor magnets 42 projecting from the open end of the frame 43 and the outer peripheral faces 42b of the rotor magnets 42 at the annular wall 45 side. The covering portion 52 can prevent the rotor magnets 42 from falling off and protect them. Consequently, the rotor magnets 42 can be prevented from being chipped or broken. Furthermore, iron powder etc. can be prevented from adhering to the rotor magnets 42.

Figure 30:
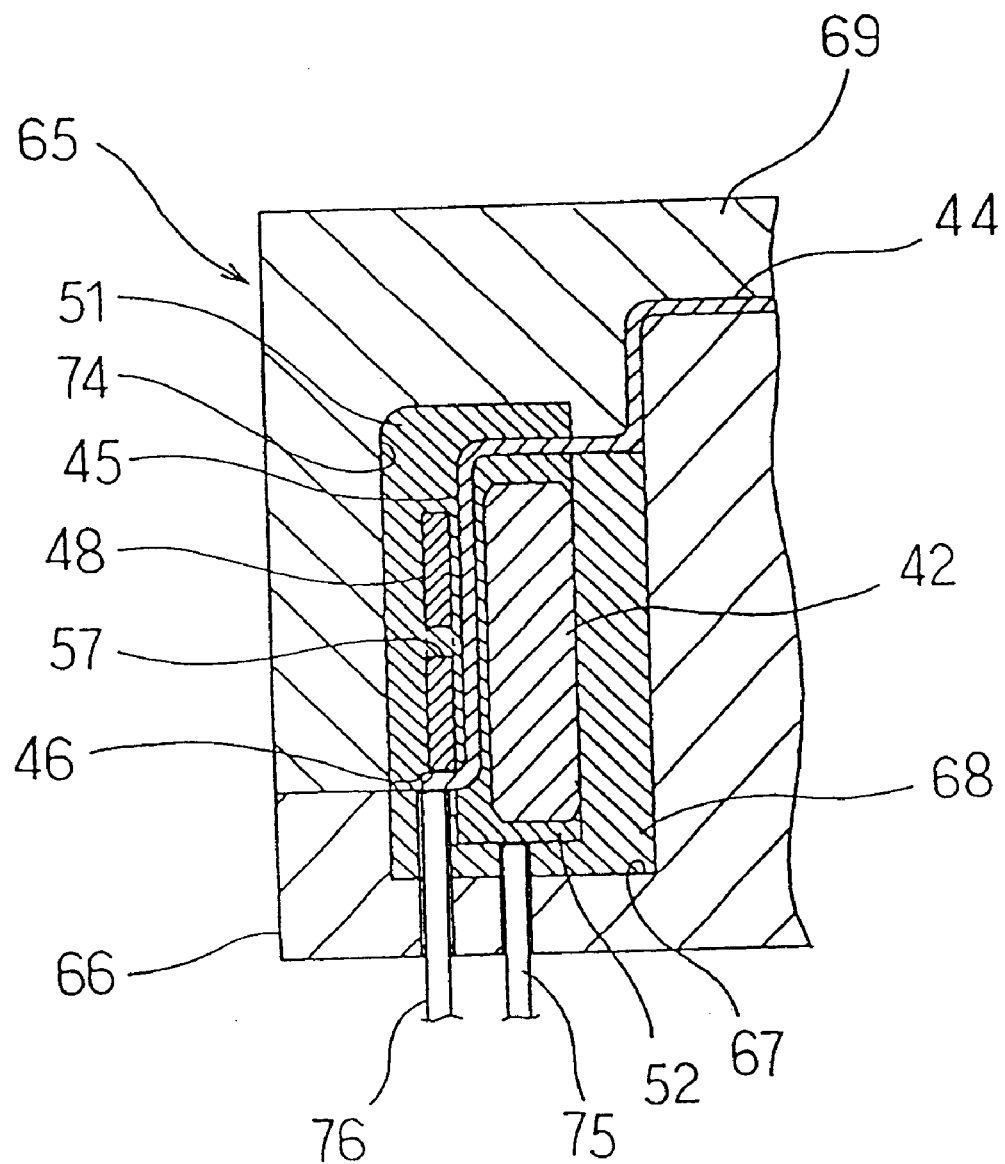
FIG. 30 is a partial longitudinal section of the rotor.

The rotor magnets 42, frame 43 and ring member 48 are enclosed by the resin molded member and thereafter, the molding is pushed by a knock pin 75 so as to be released from the forming mold 65, as shown in FIG. 30. In this case, the covering portion 52 is pushed by the knock pin 75. Since the rotor magnets 42 can be protected as compared with the case where the rotor magnets are directly pushed by the knock pin, the rotor magnets 42 can be prevented from being chipped or broken. Furthermore, the open end of the annular wall 5 of the frame 43 or the flange 46 is exposed and the flange 46 is pushed by a knock pin 76 when the molding is released from the forming mold 65. Since the frame 43 has a mechanical strength higher than the other portions and hard to deform, the flange 46 can strongly be pushed by the knock pin 75. Consequently, since the pushing force of the knock pin 75 pushing the other portion can be reduced, the deformation of the molding or rotor 41 can be prevented during the mold release.

Figure 18:
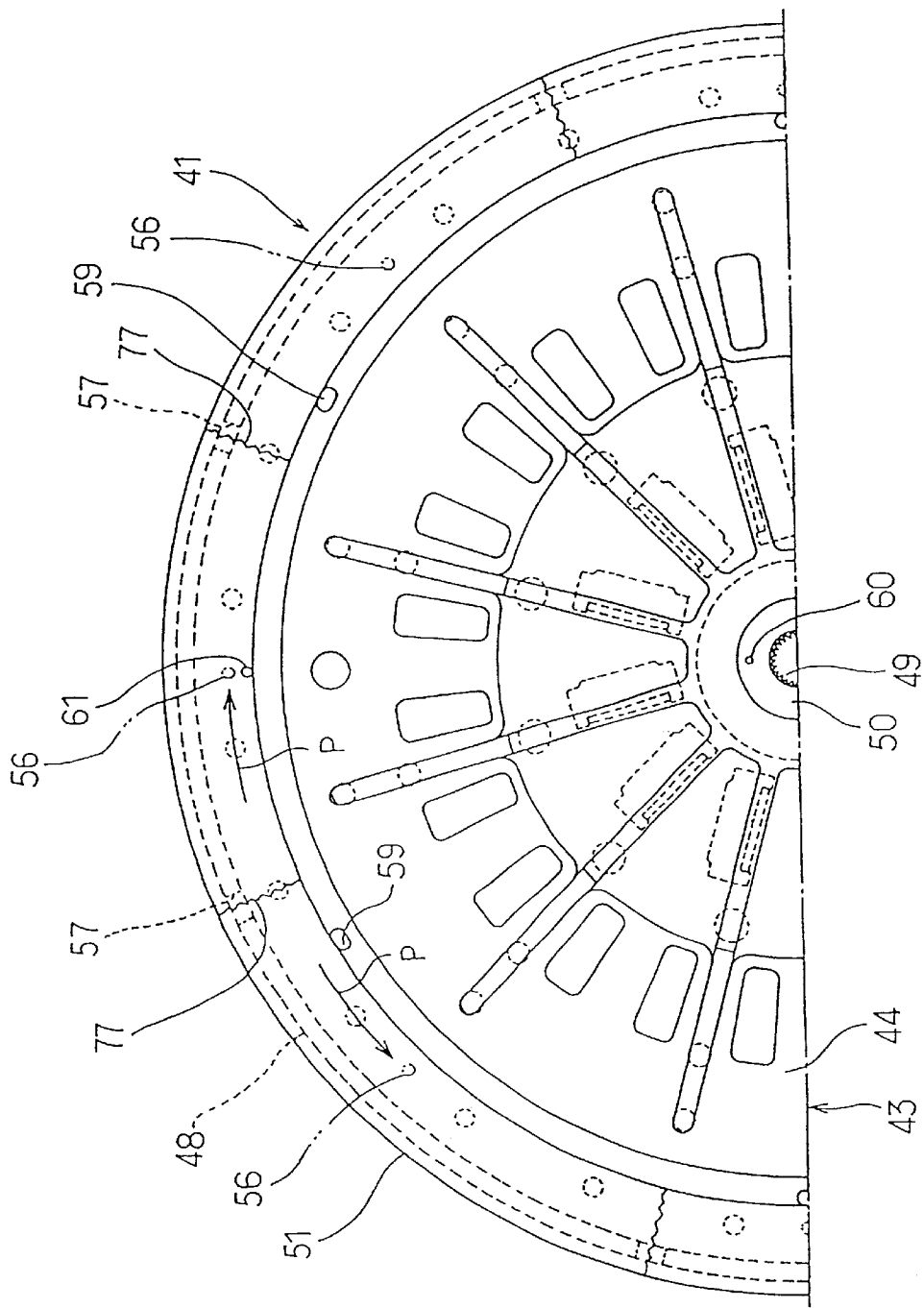
FIG. 18 is a partial plan view of the rotor as viewed from the outside thereof.

When the rotor 41 is enclosed by the resin, flows of resin collide with each other between the gates 56 through which the resin is poured into the cavity 74 (see FIGS. 27–29) so that weld lines 77 are formed as shown in FIG. 18. Cracks tend to occur in the portions of the resin molded member 51 where the weld lines 77 are formed. The reason for this is that a coefficient of thermal expansion differs among the resin molded member 51, frame 43 and ring member 48 to a large extent. The differences in shrinkage among the resin molded member 51, frame 43 and ring member 48 cause tensile forces as shown by arrows P in FIG. 18 on the portions of the resin molded member 52 in the vicinity of the weld lines 77.

In view of the foregoing problem, the holes 57 are formed in the portions of the ring member 48 corresponding to the weld lines 77 in the sixth embodiment. The resin is penetrated into the holes 57. Accordingly, when the resin molded member 51 is subjected to the tensile forces as shown by arrows P, the tensile forces are received by the resin in the holes 57 to be dispersed. As a result, the tensile forces can be restrained from concentrating on the portions of the member 51 in the vicinity of the weld lines 77. Furthermore, the resin molded member 51 at the outer circumferential side is connected to that at the inner circumferential side via the holes 57. Consequently, occurrence of cracks can further be prevented in the resin molded member 51. The same effect can be achieved when the holes 57 serving as the resin penetration sections are formed in the annular wall 45 of the frame 43. The resin penetration sections should not be limited to the holes 57. The resin penetration sections may be catches formed on the resin molded member 57 such as notches or grooves.

The covering portion 52 formed integrally with the resin molded member 51 has the first windows 54 through which the axial end faces 42a and the outer peripheral faces 42b of the rotor magnets 42 are exposed. Consequently, the covering portion 52 prevents the rotor magnets 42 from falling off and protects them. Moreover, the end faces 42a of the rotor magnets 42 and the end of the annular wall 45 are viewed through the first windows 54 so that the positional relation between the rotor magnets and the annular wall can visually be confirmed. Furthermore, the resin molded member 51 has the integrally formed convex portions 53 each located between the adjacent rotor magnets 42 and each having the radial distal end projecting toward the side of the stator 47 or toward the inner circumferential side. The convex portions 53 can prevent the rotor magnets 42 from striking against the stator 47 side when the rotor 41 and the stator 47 are assembled together. As a result, the rotor magnets 42 can be prevented from being chipped or broken. Additionally, the main plate 44 of the frame 43 has the air-gap confirming windows 59 formed therein to correspond to the air gap 58 between the rotor magnets 42 and the stator 47.

The marks 60 and 61 are formed on the boss 50 and the main plate 44 of the frame 43 so as to correspond to one of the teeth 49b of the fitting hole 49 respectively when the shaft is fitted into the fitting hole 49. Teeth formed on the shaft are engaged with the teeth 49b of the fitting hole 49 on the basis of the marks 60 and 61. As a result, the shaft can readily be fitted into the fitting hole 49. The marks 60 and 61 are further effective in automatically fitting the shaft into the fitting hole 49. The marks 60 and 61 may be provided so as to correspond to one of the grooves 49a. Either one of the marks 60 and 61 may be provided.

The present invention should not be limited by the description of the foregoing embodiments. Although the invention is applied to the outer rotor type motor in the foregoing embodiments, the invention may be applied to inner rotor type electric motors in which the rotor is located inside the stator. In the inner rotor type motor, the rotor magnets are disposed along the outer circumference of the annular wall of the frame. The ring member may be disposed along the inner circumference of the annular wall. The frame may be formed of a magnetic material into the shape of a plate.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A method of making a rotor for an electric motor including a stator, the method comprising steps of:

holding, on an intermediate mold, a plurality of annularly disposed rotor magnets, a frame made of steel plate and formed generally into a shape of a bottomed short cylinder, the frame having a disc-like main plate and a short cylindrical annular wall disposed outside the annularly disposed rotor magnets so as to be located at a side opposed to the stator with respect to the rotor magnets, the annular wall having an open end, and a ring member made of a magnetic material and disposed along the annular wall of the frame at an inner or outer circumferential side of the annular wall;

accommodating the rotor magnets, the frame and the ring member held on the intermediate mold into a forming mold; and pouring a molten resin into the forming mold accommodating the rotor magnets, the frame and the ring member and hardening the resin.

2. A method according to claim 1, wherein axial ends of the rotor magnets projecting outward from an open end of the annular wall of the frame are fitted into concave portions formed in the intermediate mold so that the rotor magnets are positioned.

3. A method of making a rotor for an electric motor including a stator, the method comprising steps of:

accommodating, in a forming mold, a plurality of annularly disposed rotor magnets, a frame made of steel plate and formed generally into a shape of a bottomed short cylinder, the frame having a disc-like main plate and a short cylindrical annular wall disposed outside the annularly disposed rotor magnets so as to be located at a side opposed to the stator with respect to the rotor magnets, the annular wall having an open end, and a short cylindrical ring member made of a magnetic material and disposed along the annular wall of the frame at an inner or outer circumferential side of the annular wall, the rotor magnets having axial ends projecting outward from an open end of the annular wall of the frame, the axial ends of the rotor magnets being fitted into concave portions formed in the forming mold respectively during the accommodating step so that the rotor magnets are positioned; and pouring a molten resin into the forming mold accommodating the rotor magnets, the frame and the ring member and hardening the resin.

4. A method according to claim 3, wherein a part of the axial end of each rotor magnet projecting from the open end of the frame is covered by the resin.

5. A method according to claim 3, wherein the axial end of each rotor magnet projecting from the open end of the frame has a side surface including a part thereof located at the annular wall side and covered by the resin during the resin pouring step.

6. A method according to claim 3, wherein the axial end of each rotor magnet projecting from the open end of the frame has a a first surface including a part thereof covered by the resin and a second side surface including a part thereof located at the annular wall side and covered by the resin during the resin pouring step, and the open end of the frame is exposed during the resin pouring step.

7. A method according to claim 3, wherein the resin is penetrated into a concave resin penetration portion formed in a portion of the ring member or the annular wall of the frame located between pouring gates during the resin pouring step.

8. A method of making a rotor for an electric motor including a stator, the method comprising steps of:

accommodating, in a forming mold, a plurality of annularly disposed rotor magnets, a frame made of steel plate and formed generally into a shape of a bottomed short cylinder, the frame having a disc-like main plate and a short cylindrical annular wall disposed outside the annularly disposed rotor magnets so as to be located at a side opposed to the stator with respect to the rotor magnets, the annular wall having an open end, and a ring member made of a magnetic material and disposed along the annular wall of the frame at an inner or outer circumferential side of the annular wall, the rotor magnets being held by magnet holding means provided in the forming mold in execution of the accommodating step; and pouring a molten resin into the forming mold accommodating the rotor magnets, the frame and the ring member and hardening the resin.

9. The method according to claim 8, wherein an intermediate mold is provided in the forming mold, and the magnet holding means is provided on the intermediate mold so that the rotor magnets, the frame, and the ring member are held by the intermediate mold.

10. The method according to claim 9, wherein the rotor magnet holding means comprises concave portions formed in the intermediate mold so that axial ends of the rotor magnets projecting outward from an open end of the annular wall of the frame are fitted thereinto respectively.

11. The method according to claim 8, wherein the rotor magnet holding means comprises concave portions formed in the forming mold so that axial ends of the rotor magnets projecting outward from an open end of the annular wall of the frame are fitted thereinto respectively.

* * * * *